United States Patent
Roesler

(10) Patent No.: US 9,182,236 B2
(45) Date of Patent: Nov. 10, 2015

(54) SYSTEM FOR POST PROCESSING GNSS/INS MEASUREMENT DATA AND CAMERA IMAGE DATA

(71) Applicant: NovAtel Inc., Calgary (CA)

(72) Inventor: Gregory J. Roesler, Calgary (CA)

(73) Assignee: NovAtel Inc., Calgary (CA)

( * ) Notice: Subject to any disclaimer, the term of this patent is extended or adjusted under 35 U.S.C. 154(b) by 173 days.

(21) Appl. No.: 14/063,615

(22) Filed: Oct. 25, 2013

(65) Prior Publication Data
US 2015/0120185 A1 Apr. 30, 2015

(51) Int. Cl.
*G01C 21/16* (2006.01)
*G01S 19/13* (2010.01)

(52) U.S. Cl.
CPC .............. *G01C 21/165* (2013.01); *G01S 19/13* (2013.01)

(58) Field of Classification Search
CPC .............................. G01C 21/165; G01S 19/13
USPC ............. 701/468; 73/1.37, 1.79; 342/357.23, 342/357.28, 357.32
See application file for complete search history.

(56) References Cited

U.S. PATENT DOCUMENTS

| 5,894,323 | A | 4/1999 | Kain et al. | |
|---|---|---|---|---|
| 7,490,008 | B2 * | 2/2009 | Draganov | 701/472 |
| 7,599,796 | B2 * | 10/2009 | Tsai et al. | 701/469 |
| 7,805,244 | B2 | 9/2010 | Park et al. | |
| 7,855,678 | B2 | 12/2010 | Scherzinger et al. | |
| 7,908,106 | B2 | 3/2011 | Cho | |
| 8,756,001 | B2 * | 6/2014 | Georgy et al. | 701/408 |
| 2010/0183192 | A1 * | 7/2010 | Fritsch et al. | 382/103 |
| 2010/0315505 | A1 * | 12/2010 | Michalke et al. | 348/118 |
| 2012/0046863 | A1 * | 2/2012 | Hope et al. | 701/531 |

* cited by examiner

*Primary Examiner* — John Q Nguyen
*Assistant Examiner* — Anshul Sood
(74) *Attorney, Agent, or Firm* — Cesari and McKenna, LLP; Patricia A. Sheehan

(57) ABSTRACT

A system for performing post processing of GNSS and INS measurement data and image data to provide highly accurate location information for a camera, an INS measurement unit or both performs first processing operations using the GNSS and INS measurement data, to determine position, velocity and attitude solutions. The system then analyzes the solutions to determine which measurement data provide sufficiently reliable solutions from which to determine the precise position, velocity and attitude of the camera, and thus, which measurement data do not provide sufficiently reliable solutions. The system and method then performs more time consuming and processing intensive processing operations using the measurement data and camera image data that are associated with solutions that are not sufficiently reliable.

18 Claims, 3 Drawing Sheets

SYSTEM FOR POST PROCESSING GNSS/INS MEASUREMENT DATA AND CAMERA IMAGE DATA

BACKGROUND OF THE INVENTION

1. Field of the Invention

The invention relates generally to navigation mapping systems and, more particularly, to navigation mapping systems that post process GNSS/INS measurement data and camera image data.

2. Background Information

Many navigation mapping systems utilize position, velocity and attitude solutions that correspond to still or video camera images to provide location and other information of interest to users. GIS systems, for example, which provide users with the critical information such as the locations of building entrances, fire hydrants, area trees, and so forth, may rely on photographic or video images of the area and use corresponding GNSS and INS measurement data to determine the locations of the respective features of interest. Route mapping systems, such as systems for providing driving directions, may provide users with images of the end destination, intersections and other points of interest along the route, and so forth, based on the locations of the features as previously calculated using images of the area.

To calculate the locations of the features of interest, vehicles equipped with one or more cameras and a GNSS/INS subsystem travel throughout the area. At designated times, and typically essentially continuously, the one or more cameras take images, e.g., videos, of the area, and the GNSS/INS subsystem saves the GNSS and INS measurement data obtained using a GNSS receiver and the inertial measurement unit (IMU). The images, GNSS measurement data, and the INS measurement data are time tagged, for example, with GNSS time, and the images, and measurement data are saved for later processing, i.e., post processing.

The post processing performed by conventional systems consists of processing the GNSS measurement data and the INS measurement data in a known manner to calculate the position and attitude of the camera for the camera images that correspond in time to the processed measurements. Using the camera position and attitude information, the system determines the locations of features of interest identified in the images in a known manner. For applications in which precise locations are required for the features of interest, high quality, and thus costly, IMUs may be needed in environments in which there is significant signal blockage, such as, for example, certain urban environments. Further, while it is expected that the use of the camera image data in the calculations for position and attitude may help to determine more precise location information in these environments, the calculations become quite time consuming as well as processing intensive.

SUMMARY OF THE INVENTION

The invention is an improved navigation mapping system for performing post processing of GNSS and INS measurement data and image data to provide highly accurate location information for a camera, an INS measurement unit or both. The system and method performs first processing operations using the GNSS and INS measurement data, to determine sets of position, velocity and attitude solutions. The system then analyzes the sets of solutions to determine which measurement data provide sufficiently reliable solutions from which to determine the precise position, velocity and attitude of the camera, and which measurement data do not provide sufficiently reliable solutions. The system and method then performs more time consuming and processing intensive processing operations using the measurement data and the corresponding image data that are associated with solutions that are not sufficiently reliable. The improved system and method thus saves time and processing resources by selectively performing the more complex, time consuming and processor-intensive processing operations, without adversely affecting the precision of the camera location information.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
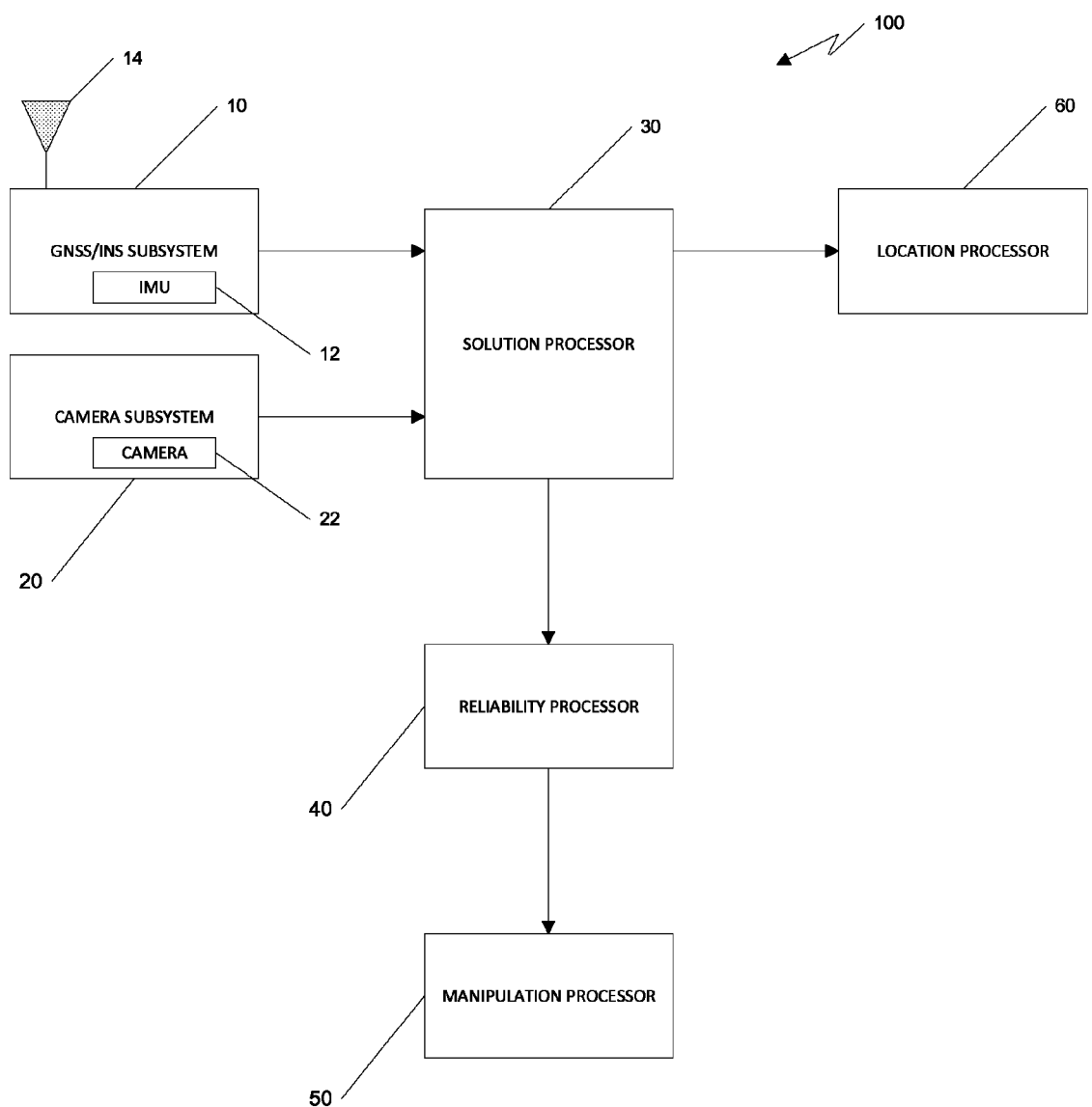
FIG. 1 is a functional block diagram of a system constructed in accordance with the invention.

Referring to FIG. 1, a navigation mapping system 100 includes a GNSS/INS subsystem 10 with a GNSS antenna 14 and an INS measurement unit 12, and a camera subsystem 20 that includes a camera 22 with known characteristics and which is in a known location relative to the GNSS antenna 14 and/or the INS measurement unit 12. The GNSS/INS subsystem 10 and camera subsystem 20 provide GNSS/INS measurement data and image data, respectively, to a position, velocity and attitude solution processor 30. The data is time tagged in GNSS time by the respective subsystems or alternatively by the processor.

The processor 30 performs first processing operations in a known manner using the measurement data provided by the GNSS/INS subsystem to calculate sets of position, velocity and attitude solutions that correspond in time to the respective camera images. As discussed in more detail below, a reliability processor 40 analyses the sets of position, velocity and attitude solutions to determine which solutions provide associated position, velocity and attitude information that are sufficiently reliable.

For the sets of solutions that are determined to be associated with reliable position, velocity and attitude information, the processor 30 provides a selected solution from each set to a location information processor 60, and the processor 60 then determines the position and attitude of the camera 22 at the times corresponding to the images. The system may then determine the locations of features in the images that correspond in time to the solutions in a known manner, based on the calculated position and attitude of the camera and the known characteristics of the camera.

For the sets of solutions that the reliability processor 40 determines are not sufficiently reliable, i.e., do not provide reliable position, velocity and attitude information, the processor 40 provides to a manipulation processor 50 the sets of solutions, the corresponding GNSS/INS measurement data and the data from images that correspond in time to the sets of solutions. The manipulation processor performs additional time consuming and complex processing operations involving the image data, to adjust the solutions and determine further processed solutions that provide more reliable position, velocity and attitude information over a time span that includes the unreliable sets of solutions.

The manipulation processor 50 then provides the further processed solutions to the location information processor 60. The location processor utilizes the reliable solutions provided by the position, velocity and attitude processor 30 as well as the further processed solutions provided by the manipulation processor and calculates the position, velocity and attitudes of the camera 22 and, as appropriate, the INS measurement unit 12. The system may then operate in a known manner to further determine the locations of features in the camera images based on the calculated position and attitude of the camera.

In contrast to performing the time consuming and complex processing operations on the entirety of the image data and the GNSS/INS measurement data, the system 100 selectively performs the more complex processing operations for only the GNSS/INS measurement data and corresponding image data that are associated with the sets of solutions that the reliability processor 40 determines are not sufficiently reliable. Thus, the manipulation processor subjects only a portion of the measurement data and image data to the more time consuming and processing intensive operations. In this way, the system 100 conserves time and processing resources by performing the time consuming and processing intensive operations only when needed to ensure the reliability of the location information.

Figure 2:
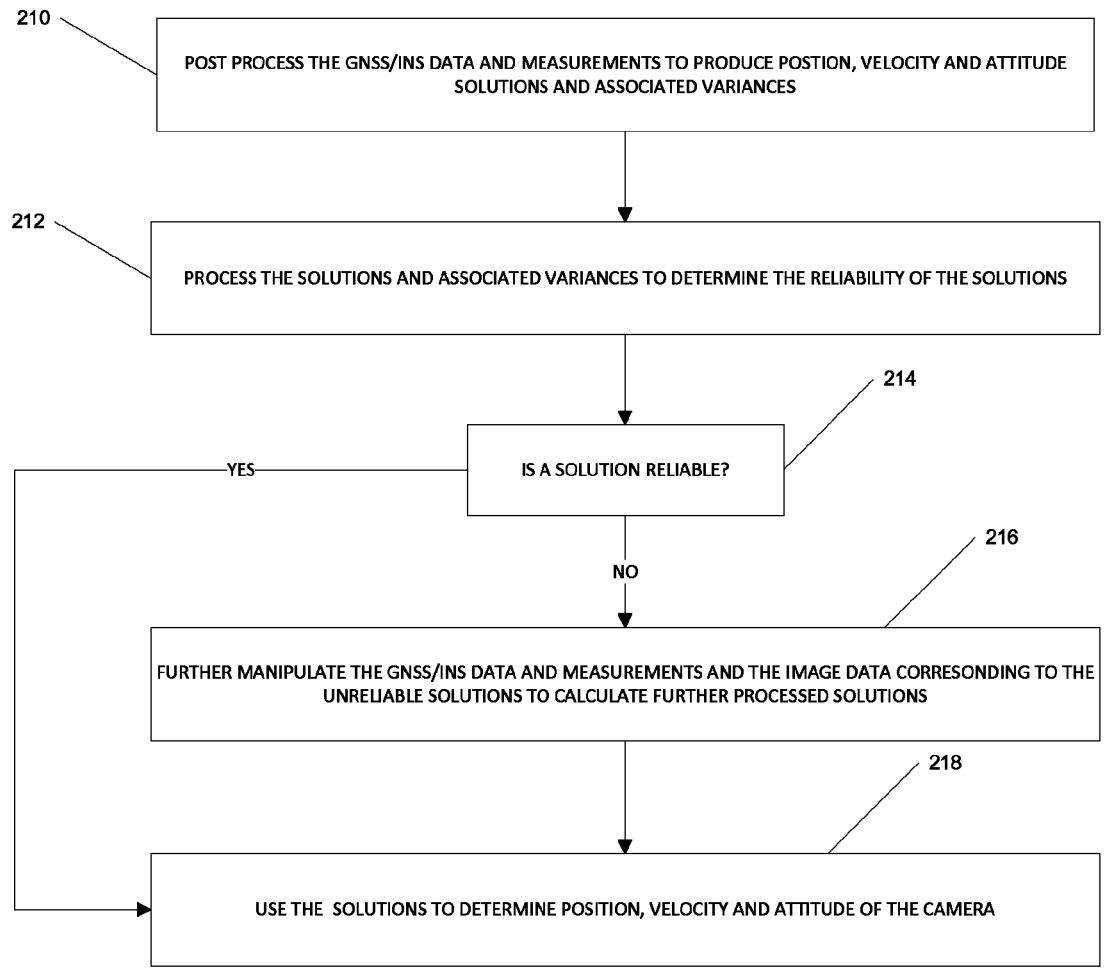
FIG. 2 is flow chart of the operations of the system of FIG. 1.
Figure 3:
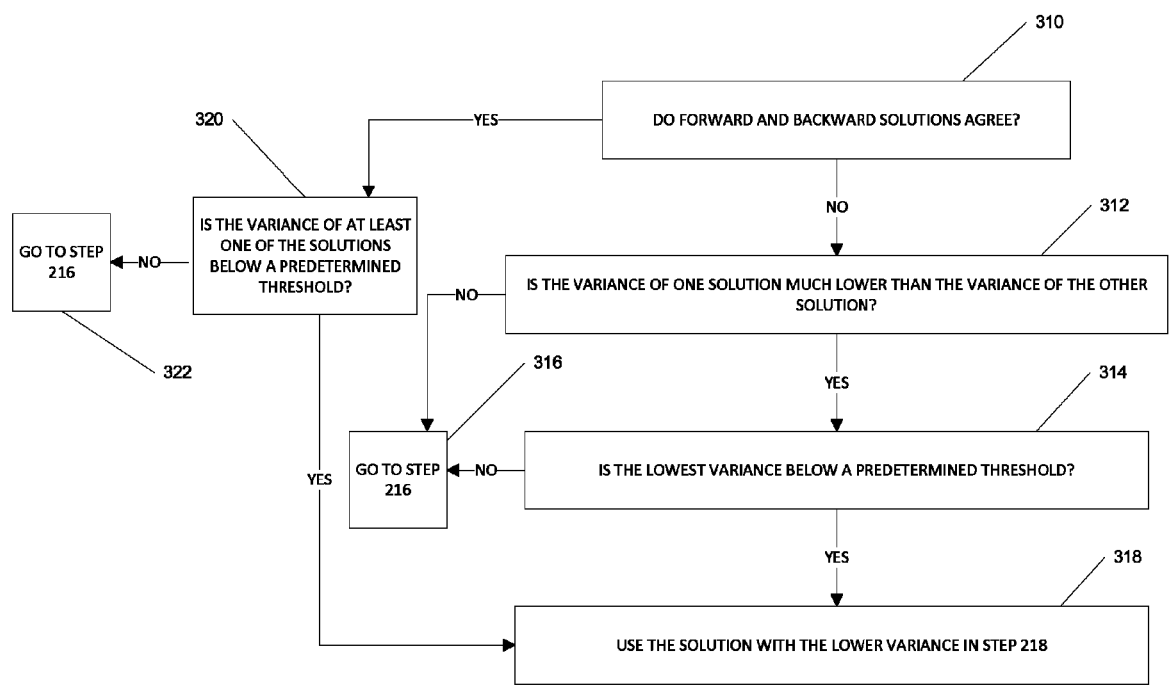
FIG. 3 is a more detailed flow chart of the operations of the system of FIG. 1

Referring also to FIGS. 2 and 3, the position, velocity and attitude processor 30 processes GNSS and INS measurement data provided by the GNSS/INS subsystem in a known manner to determine sets of position, velocity and attitude solutions and associated variances that correspond in time to images produced by the camera subsystem 20 (Step 210). The GNSS measurement data are processed at each measurement epoch. The INS measurement data are utilized at a higher rate to determine updated position, velocity and attitude between the GNSS measurement epochs, and the GNSS calculated values are utilized to correct for associated inertial sensor errors.

The GNSS measurement data and the INS measurement data are included in a time domain filter, in the example, in a Kalman filter, that processes the measurement data forward and backward through the filter in a known manner. The forward and backward calculated position, velocity and attitude solutions corresponding to the forward processing and the backward are associated with respective variances that are updated through the Kalman filter or, as appropriate, a filter smoother. The backward processing, for example, may be done using a known backwards Kalman filter smoother. Alternatively, the backward processing may be done through the Kalman filter in a known manner, by performing the updating in a reverse chronological order. The forward and backward solutions may also be combined and, as appropriate, smoothed, to produce a combined solution and associated variance.

The forward and backward calculated solutions and associated variances and, as appropriate, the combined solution and associated variance are provided as a set of solutions to the reliability processor 40, which determines if the set of solutions provides reliable position, velocity and attitude information (Steps 212, 214). More specifically, the reliability processor determines if the forward solution, the backward solution, and, as appropriate, the combined solution essentially agree, and how well they agree in terms of associated variances (Step 310).

For sets of solutions in which the respective calculated solutions agree, the reliability processor determines if at least one of the calculated solutions has a variance below a predetermined threshold (Steps 310, 320). If so, the process selects the solution with the lowest variance (Step 318). If, however, the variances are all relatively high, that is, above the predetermined threshold, the processor determines that the set of solution is not sufficiently reliable even if the calculated solutions all essentially agree. The processor then provides the set of solutions and the underlying measurement data as well as the corresponding camera image data for further processing (Steps 312, 314, 320).

If the calculated solutions do not agree and the variances are all low, the processor determines that set of solutions are unreliable, since each calculated solution is essentially equally likely, and the processor provides the set of solutions and the underlying measurement data as well as the corresponding camera image data for further processing (Steps 310, 312, 316). If the calculated solutions do not agree and only one of the solutions is associated with a variance that is below the predetermined threshold, the reliability processor selects the solution with the lowest variance (Steps 312, 314, 318).

For the sets of solutions determined to be unreliable (Steps 316, 322), the further processing utilizes image data to aid in calculating further processed solutions over the span of unreliable solutions. The further processed solutions are then used to determine the position, velocity and attitude of the camera 22 and the INS measurement unit 12 at the corresponding times (Step 218).

As an example, the reliability processor 40 compares a forward inertial solution and a corresponding backward inertial solution that differ by 20 meters. The variance, or for ease of calculation the standard deviation, for the forward solution is 1 meter and the standard deviation of the backward solution is 40 meters. The processor determines that the forward solution is sufficiently reliable and utilizes the forward position, velocity and attitude information to determine the position and attitude of the camera 22 at the time the image was taken.

In another example, the processor 40 compares forward and backward solutions that differ by 20 meters and each have variances that are low, i.e., below the predetermined threshold, the processor in this example determines that the solutions are not sufficiently reliable, since each solution is essentially equally likely. The processor then provides the solutions and the underlying measurement data as well as the corresponding camera image data for the further more complex and time consuming processing.

Once the unreliable sets of solutions have been identified, the manipulation processor 50 utilizes information associated with the corresponding images to determine further processed solutions that are more reliable. The processing performed to calculate the further processed solutions for the selected GNSS/INSS measurement data and the corresponding camera image data is both time consuming and processing intensive. The manipulation processor may, for example, perform a localized bundle, or stripwise, adjustment, using images that are taken during a time span from an earlier reliable solution to a later reliable solution.

The manipulation processor 50 processes the data in the images taken during the time span, along with the data from the images that correspond to the endpoints of the span, which are associated with reliable solutions. The image data associated with the endpoints provide position, scale and orientation while the intervening images provide information relating to changes in position, velocity and attitude over the time span based on, for example, changes in the relative locations of identifiable features in the respective images. The processor then processes the image data along with the GNSS/INS measurement data associated with the time span, in a known manner to adjust the previously calculated unreliable solutions. The solutions associated with the images closest to the end points of the time span are typically associated with the least uncertainty, while the images at the middle of the span are associated with the greatest uncertainty and the adjustments are made accordingly based on the position, velocity and attitude information derived from the image data.

The manipulation processor 50 may instead or in addition utilize other processing, for example, processing that smoothes the unreliable solutions over the time span to provide the more reliable further processed solutions. The available GNSS measurement data that are not sufficient to calculate the solution may be incorporated into the adjustment and/or smoothing operations, such as, for example, measurement data associated with times during which only a limited number of GNSS satellites are in view. In addition, observations from other sources, such as odometers and so forth may be utilized in the adjustment and/or smoothing operations.

The system 100 provides precise navigation mapping location information even in environments with substantial signal blockage. The selective use of the image data by the system allows the system to essentially produce the precise navigation mapping location information even if lower quality IMUs, which are otherwise be reserved for use in more open environments, are utilized in the environments with substantial signal blockage. The system 100 is able to calculate precise navigation mapping location information, without requiring the time consuming and processing intensive operations that would be required if the image data are used in each calculation. Such a system can thus provide a user with the precise navigation mapping location information is a reasonable time and without requiring processing intensive calculations for each position and orientation solution. Accordingly, the system may reasonably provide locations with the precision associated with using navigation grade IMUs in a timely manner to users that utilize the lower quality, and thus, less expensive, commercial grade IMUs.

While separate subsystems and processors have been described, certain or all of the subsystems and/or processors may be combined. Further, respective subsystems and/or processors may consist of multiple components. The calculated solutions may be determined to agree or disagree within an error tolerance associated with an application in which the solutions are to be utilized. The time domain filter may, but need not be, a Kalman filter.

What is claimed is:

1. A post processing navigation mapping system including:
   a camera subsystem;
   a global navigation satellite system/inertial navigation system (GNSS/INS) subsystem;
   one or more processors that receive measurement data and image data from the subsystems, the one or more processors being configured to
   calculate sets of position, velocity and attitude solutions and associated variances that correspond in time to images taken by the camera subsystem, by processing the measurement data received from the GNSS/INS subsystem forward in time and backward in time,
   determine which of the sets of solutions are reliable based on a comparison of the forward and backward solutions and their associated variances and using the reliable sets of solutions to determine position, velocity and attitude information for a camera included in the camera subsystem, and
   for sets of solutions determined to be unreliable further process the GNSS/INS measurement data and the corresponding image data from images that correspond in time to determine further processed solutions and using the further processed solutions to determine position, velocity and attitude information for one or both of the camera and an INS measurement unit included in the GNSS/INS subsystem.

2. The system of claim 1 wherein the one or more processors are further configured to determine that the set of solutions is reliable if the forward and backward solutions disagree and only one of the associated variances is below a predetermined threshold.

3. The system of claim 1 wherein the one or more processors are further configured to determine that the set of solutions is unreliable if the forward and backward solutions disagree and the associated variances are both below a predetermined threshold.

4. The system of claim 1 wherein the one or more processors are further configured to utilize information derived from the images relating to changes in position, velocity, attitude or any combinations thereof to calculate the further processed solutions.

5. The system of claim 1 wherein the one or more processors are further configured to determine that the set of solutions is unreliable if the forward and backward solutions differ by more than an associated error tolerance and associated variances are both below a predetermined threshold.

6. The system of claim 1 wherein the processors are further configured to utilize a time domain filter to determine the forward and backward solutions.

7. The system of claim 6 wherein the processors are further configured to utilize a filter smoother.

8. The system of claim 1 wherein the one or more processors are further configured to determine locations of selected features in the images.

9. The system of claim 1 wherein the one or more processors are further configured to perform localized bundle or stripwise adjustments using images that are taken during time spans from earlier reliable solutions to later reliable solutions and images corresponding to end points of the time span to determine the further processed solutions.

10. A method for post processing navigation measurement data including:
    receiving measurement data from a global navigation satellite system/inertial navigation system (GNSS/INS) subsystem and image data from a camera subsystem,
    in one or more processors
    calculating sets of position, velocity and attitude solutions and associated variances that correspond in time to images taken by the camera subsystem by processing the measurement data received from the GNSS and INS subsystems forward in time and backward in time,
    determining which of the sets of solutions are reliable based on a comparison of the forward and backward solutions and their associated variances and using the reliable sets of solutions to determine position, velocity and attitude of a camera included in the camera subsystem, and
    for sets of solutions determined to be unreliable further processing the GNSS/INS measurement data and the image data from images that correspond in time to determine further processed solutions and using the further processed solutions to determine position, velocity and attitude for one or both of the camera and an INS measurement unit included in the GNSS/INS subsystem.

11. The method of claim 10 wherein a given set of solutions is determined to be reliable if the forward and backward solutions disagree and a single associated variance is below a predetermined threshold.

12. The method of claim 10 wherein a given set of solutions is determined to be unreliable if the forward and backward solutions differ and associated variances are both below a predetermined threshold.

13. The method of claim 10 wherein information derived from the images relating to changes in position, velocity, attitude or any combinations thereof are utilized to calculate the further processed solutions.

14. The method of claim 10 wherein a given set of solutions is determined to be unreliable if the forward and backward solutions differ by more than an associated error tolerance and associated variances are below a predetermined threshold.

15. The method of claim 10 wherein a time domain filter is utilized to determine the forward and backward solutions and associated variances.

16. The method of claim 15 wherein a filter smoother is further utilized.

17. The method of claim 10 further including determining locations of selected features in the images based on the position and attitude of the camera.

18. The method of claim 10 wherein further processed solutions are determined using localized bundle or stripwise adjustments that use images that are taken during time spans from earlier reliable solutions to later reliable solutions and images corresponding to end points of the time span.

* * * * *